United States Patent
Sanders

(10) Patent No.: US 7,356,207 B2
(45) Date of Patent: Apr. 8, 2008

(54) METHOD AND SYSTEM FOR ADJUSTING THE SENSITIVITY OF OPTICAL SENSORS

(75) Inventor: Steven J. Sanders, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/489,822

(22) Filed: Jul. 19, 2006

(65) Prior Publication Data

US 2007/0280582 A1 Dec. 6, 2007

Related U.S. Application Data

(60) Provisional application No. 60/811,455, filed on Jun. 5, 2006.

(51) Int. Cl.
*G02B 6/00* (2006.01)

(52) U.S. Cl. ....................................................... 385/12

(58) Field of Classification Search ............... 385/12, 385/13, 15; 356/32; 374/123; 250/227.14, 250/227.16
See application file for complete search history.

(56) References Cited

U.S. PATENT DOCUMENTS 4,767,219 A * 8/1988 Bibby ........................ 374/123
6,813,403 B2 * 11/2004 Tennyson .................... 385/12

OTHER PUBLICATIONS

Gonzalez-Herraez, M., et al., "Optically controlled slow and fast light in optical fibers using stimulated Brillouin scattering," *Applied Physics Letters*, 87 081113 (Aug. 2005) (3 pages).

* cited by examiner

*Primary Examiner*—Quyen P Leung
(74) *Attorney, Agent, or Firm*—Ingrassia Fisher & Lorenz

(57) ABSTRACT

A method and a system for adjusting the sensitivity of an optical sensor are provided. A first beam of light in an optical fiber is separated into first and second portions propagating therethrough at a first speed. A second beam of light is directed into the optical fiber to interact with the first beam of light such that the first and second portions propagate through the optical fiber at a second speed. The propagation speed in turn influences the sensitivity of the optical sensor.

18 Claims, 2 Drawing Sheets

METHOD AND SYSTEM FOR ADJUSTING THE SENSITIVITY OF OPTICAL SENSORS

This application claims the benefit of U.S. Provisional Application No. 60/811,455, filed Jun. 5, 2006.

TECHNICAL FIELD

The present invention generally relates to optical sensors, and more particularly relates to a method and system for adjusting the sensitivity of fiber optic sensors.

BACKGROUND

In recent years optical sensors have become widely used in various technologies to make many different sorts of measurements. Many optical sensors, such as strain sensors and fiber optic gyroscopes, operate by making "time of flight measurements." That is, such optical sensors measure the amount of time it takes for light to travel a particular optical path length, such as down the length of an optical fiber or around a coil of optical fiber. However, depending on the particular type of optical sensor, the measurement being made may not be of the total amount of time it takes for the light to travel the given path, but rather of the time difference it takes different portions of the light to travel the optical path.

For example, Optical Time Domain Reflectometers (OTDRs) are often used to determine the presence, as well as the locations, of various features along an optical fiber, such as optical components and deformations (e.g., cracks). OTDRs perform such measurements by emitting a pulse of light down the optical fiber and measuring how much time passes before reflections of the light return. As the light propagates down the optical fiber, some of the features cause a portion of the light to be reflected, while allowing another portion of the light to pass. The portion of light that passes through the feature will eventually be reflected back towards the OTDR, such as by the end of the optical fiber. The result is that the two portions of light travel different optical path lengths, and thus require different amounts of time to return to the OTDR. By measuring and comparing the "time of flight" for each of the portions of light, the OTDR can be used to determine not only the length of the optical fiber but also the locations of the features along the optical fiber that reflect the light.

In a similar manner, fiber optic gyroscopes (FOGs) use time of flight measurements to detect rotation by essentially comparing the time it takes different portions of light to travel in opposite directions around a coil of optical fiber. In FOGs, the time of flight difference is not necessarily measured by time per se, but by interference patterns caused by the two portions of light as they are captured by a photo-detector.

The resolution, and thus the sensitivity, of such optical sensors is limited by the sensitivity of the particular device or process being used to detect the returning light and measure the time of flight difference. For example, the resolution of optical sensors using an OTDR is limited by the smallest time difference (i.e., the most closely spaced portions of light) that the OTDR is able to detect. Therefore, if two features along the optical fiber are within a very small distance (e.g, a few microns), the two portions of the light will return to the OTDR during a very small window of time (e.g., a few femtoseconds). If the OTDR is unable to distinguish both portions of the light, one or more features along the optical fiber may not be detected.

Likewise, in a FOG, if the photo-detection used is unable to detect subtle interference patterns, the FOG may not be able to detect extremely low rates of rotation. Often, the sensitivity of FOGs is increased by lengthening the optical fiber used. However, such a solution has the disadvantage that it increases the overall size of the device.

Accordingly, it is desirable to provide a method and system for adjusting the sensitivity of optical sensors. In addition, it is desirable to provide a method and system that increases the sensitivity of optical sensors while minimizing overall size. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for adjusting the sensitivity of a fiber optic sensor. A first beam of light in an optical fiber is separated into first and second portions propagating therethrough at a first speed. A second beam of light is directed into the optical fiber to interact with the first beam of light such that the first and second portions propagate through the optical fiber at a second speed.

A fiber optic sensor is provided. The fiber optic sensor includes an optical fiber assembly having an optical fiber including a selected material having a Brillouin shift and a beam splitting feature coupled to the optical fiber. A first light source is coupled to the optical fiber to direct a first beam of light having a first optical frequency into the optical fiber. The first beam of light splits into first and second portions separated by an amount of time as the first beam of light propagates into the beam splitting feature. A second light source is coupled to the optical fiber to direct a second beam of light into the optical fiber. The second beam of light has a second optical frequency and interacts with the first beam of light such that the amount of time separating the first and second portions of the first beam of light is altered. The second frequency is approximately equal to the sum or difference of the first frequency and the Brillouin shift for the selected material. A detector is coupled to the optical fiber to capture the first and second portions of the first beam of light and measure the altered amount of time separating the first and second portions.

BRIEF DESCRIPTION OF THE DRAWINGS

The present invention will hereinafter be described in conjunction with the following drawing figures, wherein like numerals denote like elements.

DETAILED DESCRIPTION

Figure 2:
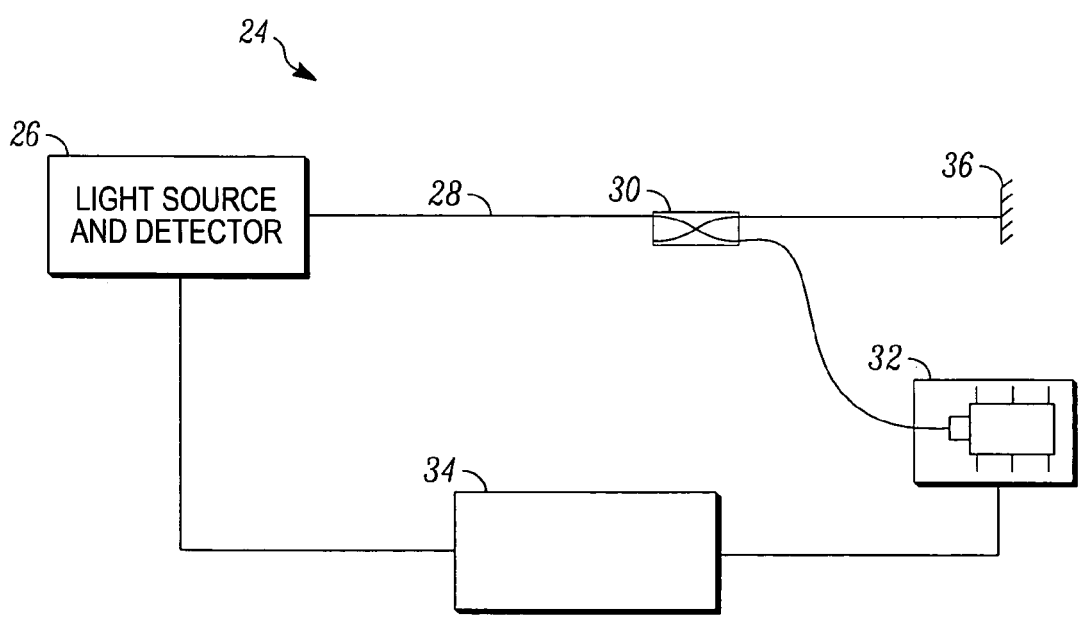
FIG. 2 is a schematic view of a fiber optic sensor according to one embodiment of the present invention.
Figure 3:
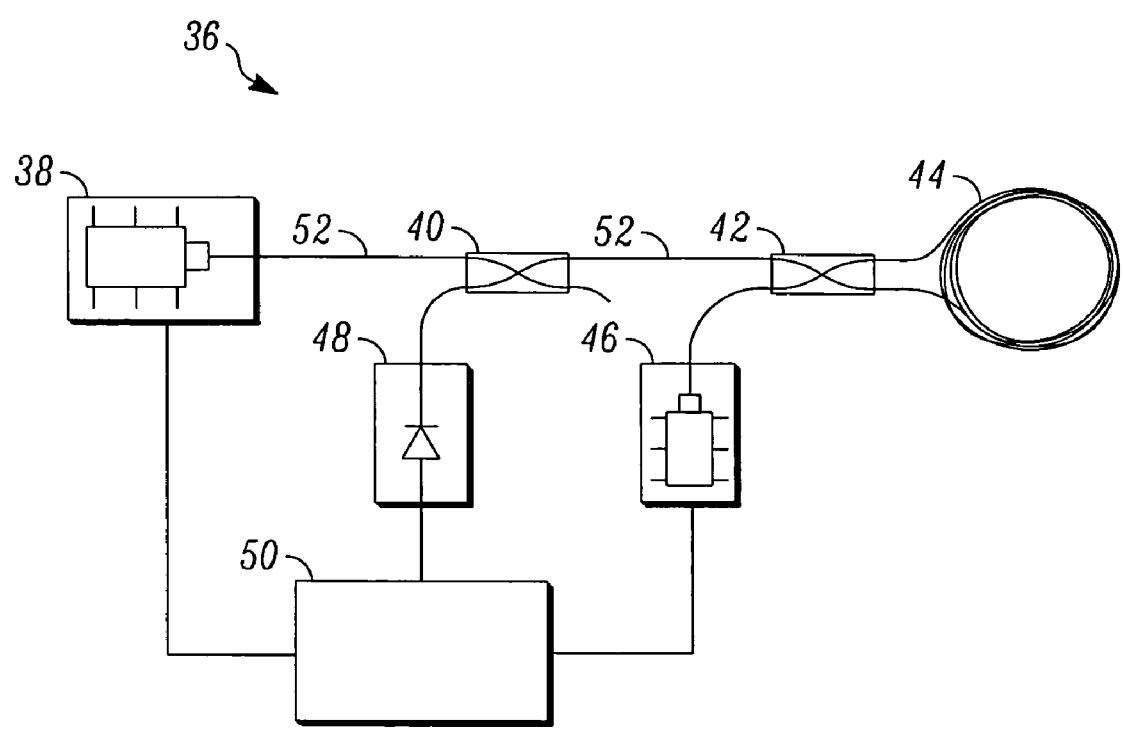
FIG. 3 is a schematic view of a fiber optic gyroscope according to another embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be noted that FIGS. 1-3 are merely illustrative and may not be drawn to scale.

Figure 1:
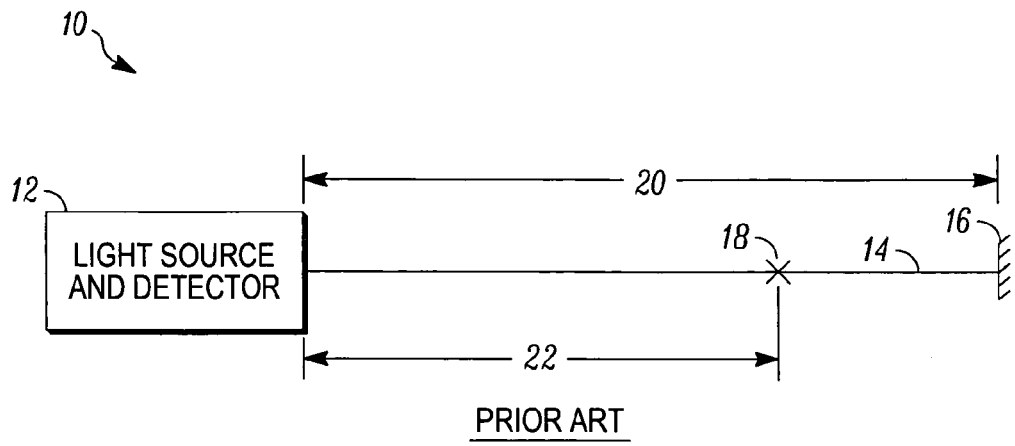
FIG. 1 is a schematic view of a fiber optic sensor.

FIG. 1 illustrates a fiber optic sensor 10. The fiber optic sensor 10 includes a light source and detector 12 and an optical fiber 14 coupled to an output of the light source and detector 12. The optical fiber 14 includes a reflector 16 at an end thereof opposing the light source and detector 12 and a beam splitting feature 18 at a middle portion thereof. The reflector 16 may be any one of numerous types of reflective devices such as a mirror, a right-angle cleaved end, or simply an end cap connected to the optical fiber 14. The beam splitting feature 18 may be any one of numerous objects that, either by design or unintentionally, splits any light propagating through the optical fiber by, for example, being transmissive to one portion of the light while reflecting another portion of the light. Examples of beam splitting features include beam splitting mirrors, Y-splitters, and deformations within the optical fiber 14, such as cracks, creases, and foreign objects. As shown, the optical fiber 14 has a full length 20 ("L"), as measured from end-to-end, and a partial length 22 ("l"), as measured from the end adjacent to the light source and detector 12 to the beam splitting feature 18. As will be appreciated by one skilled in the art, the beam splitting feature 18 may also represent a change in the full length 20 of the optical fiber 14 due to environmental changes, such as a change in temperature.

During operation, the light source and detector 12 emits a pulse of light into the optical fiber 14. As the light approaches the beam splitting feature 18, a first portion of the light is reflected by the beam splitting feature 18 back towards the light source and detector, and a second portion of the light passes by, or through, the beam splitting feature 18 and continues to propagate towards the reflector 16. At the reflector 16, the second portion of the light is reflected back towards the light source and detector 12. In addition to emitting the pulse of light, the light source and detector 12 captures and detects the first and second portions of the light and measures the time interval between the emission of the light pulse and the return of both the first and second portions of light. The time interval for the first and second portions of light may be expressed as $$t_1 = 2nl/c \text{ and } t_2 = 2nL/c,$$

respectively, where n is the index of refraction of the material in the optical fiber and c is the speed of light in a vacuum.

As such, the time difference between the return of the first and second portions may be expressed as $$\Delta t = t_1 - t_2 = 2nL/c - 2nl/c \text{ or } \Delta t = 2n/c \ (L-1).$$

Therefore, for a given distance (L−1) between the reflector and the beam-splitting feature, a change in the index of refraction of the material within the optical fiber 14, and thus the speed of light within the material, will alter the detected time difference $\Delta t$. As a result, as the index of refraction of the optical fiber increases for a given distance L−1, the resolution of the fiber optic sensor 10 increases because of the increase in $\Delta t$. That is, an increase in the index of refraction of the optical fiber 14 allows the fiber optic sensor 10 to detect smaller features.

FIG. 2 illustrates a fiber optic sensor 24 according to one embodiment of the present invention. The fiber optic sensor 24 may be, for example, a strain sensor, a temperature sensor, a radiation sensor, a humidity sensor, or any one of numerous types of optical sensors, and may likewise be installed in an appropriate material or system in which the detection of a particular characteristic is desired. The fiber optic sensor 24 includes a light source and detector 26, an optical fiber 28, a fiber optic coupler 30, a control light source 32, and a computer control module 34.

Although not specifically illustrated, the light source and detector 26 includes any light source typically used in fiber optic sensors and a photo-detector or similar light detection apparatus. In one embodiment, the light source and detector 26 is an Optical Time Domain Reflectometer (OTDR). The optical fiber 28 is connected to an output/input of the light source and detector 26 and includes a reflector 36 at an opposing end thereof. In one embodiment, the optical fiber 28 is silica optical fiber, as is commonly understood in the art, and has an index of refraction of approximately 1.5 and a Brillouin shift ($\kappa_B$) of, for example, between approximately 10 and 20 gigahertz (Ghz), such as approximately 11 Ghz. The fiber optic coupler 30 is, for example, a 50/50 coupler or splitter, and is coupled to the light source and detector 26 on one side thereof and the reflector 36 and the control light source 32 on the opposing side thereof. The control light source 32 is a tunable light source, as is commonly understood.

The computer control console 34 is in operable communication with the light source and detector 26 and the control light source 32 and may include electronic components, including various circuitry and integrated circuits, such as an Application Specific Integration Circuit (ASIC) and/or instructions stored on a computer readable medium to be carried out by a computing system and perform the methods and processes described below. Although not shown, the computer control console 34 may also include power supplies for the light source and detector 26 and the control light source 32.

In use, still referring to FIG. 2, the light source and detector 26 and the control light source 32 are activated. The light source and detector 26 emits pulses of light (i.e., a first or signal beam of light) having, for example, a frequency ($f_{signal}$) of between $1.9 \times 10^5$ and $2 \times 10^5$ Ghz and a wavelength of between 1500 and 1550 nm, down the optical fiber 28 towards the coupler 30 (i.e., in a first direction). The control light source 32 emits, in one example, a stream of light (a second or control beam of light) through the coupler 30 and into the optical fiber 28 towards the light source and detector 26 (i.e., in a second direction). The control light source 32 is tuned such that the light emitted therefrom has a frequency ($f_{control}$) that is equal to, or at least approximately equal to, the sum or difference of the frequency of the light emitted from the light source and detector 26 and the Brillouin shift of the particular optical fiber being used. In particular, the control light source is preferably tuned such that $f_{control} = f_{signal} + v_B$.

As will be appreciated by one skilled in the art, because of the relationship between the frequencies of the light and the Brillouin shift of the optical fiber 28, nonlinear interaction, or interference, between the light from the light source and detector 26 and the light from the control light source 32 occurs within the optical fiber, which causes Brillouin scattering. The Brillouin scattering causes a change (i.e., increase or decrease) in the index of refraction of the optical fiber thus modifying (i.e., increasing or decreasing) the propagation phase velocity and/or group velocity of the signal beam of light within the optical fiber 28. In the case of an increased index of refraction, when the signal beam of light is split, as described above in reference to FIG. 1, due to either a deformation in the optical fiber 28 or a change in the length of the optical fiber, the separation between the first and second portions of light will in effect be increased, as will the time delay therebetween. Thus, when the first and second portions of light are captured by the light source and detector 26, the amount of time measured between will be increased, thereby increasing the sensitivity of the fiber optic sensor 24.

FIG. 3 illustrates a fiber optic gyroscope 36, according to another embodiment of the present invention. The fiber optic gyroscope 36 includes a signal light source 38, first and second optical couplers 40 and 42, a fiber optic coil 44, a control light source 46, a photo-detector 48, a computer control module 50, and optical fibers 52 interconnecting various components of the gyroscope 36.

The signal light source 38 is any light source typically used in fiber optic gyroscopes, such as a Fiber Light Source (FLS) assembly. In one embodiment, the signal light source 38 includes a 980 nm semiconductor pump laser containing an erbium doped fiber (EDF) capable of generating light with a mean wavelength in the range of approximately 1530-1550 nm and with a bandwidth of greater than 20 nm.

Still referring to FIG. 3, the first optical coupler 40 is coupled, via the optical fibers 52, to the signal light source 38 and the photo-detector 48 on one side thereof and the second optical coupler 42 on the other side thereof. The second optical coupler 42 is also coupled to the control light source 46 on a side thereof adjacent to the first coupler 40 and the fiber optic coil 44 on the opposing side. The fiber optic coil 44, or fiber sensing loop, is a winding of fiber optic cable, positioned around an axis (i.e., axis of rotation), having a length of, for example, between 1 m and 6 km. The control light source 46 is, in one embodiment, a tunable light source and as shown is coupled to a non-reciprocal port of the second optical coupler 42, as will be appreciated by one skilled in the art. Although not shown, the photo-detector 48 includes a photodiode and is capable of detecting any relative optical phase shifts, frequency differences, or interference intensities in two light beams as caused by any rotation of the gyroscope 36 about the axis of rotation of the coil 44.

The computer control console 50 is in operable communication with the signal light source 38, the photo-detector 48, and the control light source 46. The computer control console 50 may be similar to the computer control console 34 shown in FIG. 2, and likewise include instructions stored on a computer readable medium to be carried out by a computing system and perform the methods and processes described below.

In use, the signal light source 38 emits light (i.e., a signal light beam), with a wavelength of, for example, between 1500 and 1550 nm, into the optical fiber 52, through the first optical coupler 40, and into the second optical coupler 42. At the second optical coupler 42, the light is split into first and second portions. The first portion of the signal light may be understood to propagate through the fiber optic coil 44 in a clockwise (CW) direction (i.e., first direction), and the second portion of the signal light may be understood to propagate through the fiber optic coil 44 in a counterclockwise (CCW) direction (i.e., second direction). As is commonly understood in the art, if the fiber optic gyroscope 36 is rotated about the axis through the fiber optic coil 44, the optical path lengths experienced by the first and second portions of the signal light through the coil 44 change. That is, if the fiber optic gyroscope is rotated in a CW direction, the optical path length traveled by the first portion of light is increased, while the path length for the second portion of light is shortened, and vice versa.

Both the first and second portions of the signal light beam propagate from the fiber optic coil 44 back through the second optical coupler 42 and into the first optical coupler 40, where a portion thereof is directed into the photo-detector. The photo-detector 48 sends an electrical signal to the computer control console 50, which processes the signal and determines the rate of rotation of the fiber optic gyroscope 36.

In a manner similar to that described above, in order to control the sensitivity of the fiber optic gyroscope 36, the control light source 46 is activated and tuned to emit a particular frequency of light (i.e., a control light beam) into the non-reciprocal port of the second optical coupler 42. As in the embodiment shown in FIG. 2, the control light source 46 shown in FIG. 3 is tuned such that $f_{control} = f_{signal} + \kappa_B$.

When the control light beam passes through the second optical coupler 42, the control light beam is split into both a CW portion and a CWW portion, both of which propagate though the coil 44 and interact nonlinearly with the respective first and second portions of the signal light beam. As is described above, because of the relationship between the frequencies of the signal and control light beams, as well as the Brillouin shift of the optical coil fiber 44, the interaction between the signal light beam and the control light beam within the optical fiber causes Brillouin scattering. The Brillouin scattering causes an increase in the index of refraction of the optical fiber 52, as well as the fiber optic coil 44, thus slowing the propagation of both the first and second portions of the signal light beam within the optical fiber 52. As a result, when the fiber optic gyroscope 36 is rotated about the axis of rotation, the time delay between the first and second portions of light will in effect be increased, thereby increasing their relative phase shift, and thus the sensitivity of the fiber optic gyroscope 36.

Although the examples above are generally described as utilizing Brillouin scattering to increase the index of refraction of the material within the optical fiber, it should be understood that Brillouin scattering may also be used to decrease the index of refraction of the material, and thus decrease the sensitivity of the particular optical sensor.

One advantage of the method and system described above is that because the time of flight difference between the portions of signal light is increased, the sensitivity and the resolution of the optical sensor is improved. Another advantage is that because of the increase in sensitivity for a given length of optical fiber, the overall size of the optical sensor is minimized without sacrificing performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for adjusting the sensitivity of a fiber optic sensor comprising:
   directing a first beam of light into an optical fiber having a feature coupled thereto that separates the first beam of light into first and second portions propagating through the optical fiber at a first speed;

directing a second beam of light into the optical fiber to interact with the first beam of light such that the first beam of light propagates through the optical fiber at a second speed;

capturing the first and second portions of the first beam of light; and measuring at least one of an amount of time between said capturing of the first and second portions of the first beam of light, an optical phase shift between the first and second portions of the first beam of light, and an interference intensity between the first and second portions of the first beam of light.

2. The method of claim 1, wherein the first beam of light has a first frequency and the second beam of light has a second frequency.

3. The method of claim 2, wherein the optical fiber comprises a selected material.

4. The method of claim 3, wherein the second frequency is approximately equal to at least one of the sum of the first frequency and the Brillouin shift for the selected material and the difference of the first frequency and the Brillouin shift for the selected material.

5. The method of claim 4, wherein said direction of the first beam of light into the optical fiber is in a first direction and said direction of the second beam of light into the optical fiber is in a second direction.

6. The method of claim 5, wherein the first portion of the first beam of light is reflected by the feature and the second beam of light is transmitted through the at least one feature.

7. The method of claim 6, wherein at least one of an index of refraction of the selected material, a phase velocity of the first beam, and a group velocity of the first beam is altered by said interaction between the first and second beams of light.

8. The method of claim 7, wherein said interaction between the first and second beams of light changes the index of refraction of the selected material and wherein the second amount of time is greater than the first amount of time.

9. A method for adjusting the sensitivity of a fiber optic sensor comprising:

directing a first beam of light of a first frequency into an optical fiber having at least one feature coupled thereto that separates the first beam of light into at least first and second portions propagating through the optical fiber at a first speed;

directing a second beam of light of a second frequency into the optical fiber to interact with the first beam of light such that the at least first and second portions propagate through the optical fiber at a second speed;

capturing the at least first and second portions of the first beam of light; and measuring at least one of an amount of time between said capturing of the at least first and second portions of the first beam of light, an optical phase shift between the at least first and second portions of the first beam of light, and an interference intensity between the at least first and second portions of the first beam of light.

10. The method of claim 9, wherein the optical fiber comprises a selected material having an index of refraction and said interaction between the first and second beams of light changes the index of refraction and the amount of time separating the first and second portions of the first beam.

11. The method of claim 10, wherein the second frequency is approximately equal to at least one of the sum of the first frequency and the Brillouin shift for the selected material and the difference of the first frequency and the Brillouin shift for the selected material.

12. The method of claim 11, wherein the feature is a splitter coupling the optical fiber to a coil of optical fiber, the splitter causing the first portion of light to propagate around the coil in a first direction and the second portion of propagate around the coil in a second direction.

13. The method of claim 12, wherein said separation between the first and second portions of the first beam of light is at least partially caused by rotation of the coil about an axis extending therethrough.

14. A fiber optic sensor comprising:

an optical fiber assembly comprising an optical fiber and a beam splitting feature coupled to the optical fiber, the optical fiber comprising a selected material having a Brillouin shift;

a first light source coupled to the optical fiber to direct a first beam of light of a first frequency into the optical fiber, the first beam of light splitting into first and second portions separated by an amount of time as the first beam of light propagates into the beam splitting feature;

a second light source coupled to the optical fiber to direct a second beam of light of a second frequency into the optical fiber to interact with the first beam of light such that the amount of time separating the first and second portions of the first beam of light is altered, the second frequency being approximately equal to at least one of the sum of the first frequency and the Brillouin shift for the selected material and the difference of the first frequency and the Brillouin shift for the selected material; and a detector coupled to the optical fiber to capture the first and second portions of the first beam of light and measure the altered amount of time separating the first and second portions.

15. The fiber optic sensor of claim 14, wherein the first light source is configured to direct the first beam of light in a first direction through the optical fiber and the second light source is configured to direct the second beam of light in a second direction through the optical fiber.

16. The fiber optic sensor of claim 15, wherein the optical fiber assembly further comprises an fiber optic coil coupled to the optical fiber and the beam splitting feature such that the first portion of the first beam of light propagates around the coil in a first direction and the second portion of the first beam of light propagates around the coil in a second direction, a material within the fiber optic coil having a Brillouin shift that is substantially the same as the Brillouin shift of the selected material.

17. The fiber optic sensor of claim 16, wherein an index of refraction of the selected material is altered by said interaction between the first and second beams of light.

18. The fiber optic sensor of claim 17, wherein said interaction between the first and second beams of light changes the index of refraction of the selected material and the amount of time separating the first and second portions of the first beam of light.

* * * * *

UNITED STATES PATENT AND TRADEMARK OFFICE
CERTIFICATE OF CORRECTION

| | | |
|---|---|---|
| PATENT NO. | : 7,356,207 B2 | Page 1 of 1 |
| APPLICATION NO. | : 11/489822 | |
| DATED | : April 8, 2008 | |
| INVENTOR(S) | : Steven J. Sanders | |

It is certified that error appears in the above-identified patent and that said Letters Patent is hereby corrected as shown below:

Col. 7, line 29
In Claim 6 the words "at least one" should be deleted

Signed and Sealed this

Ninth Day of September, 2008

JON W. DUDAS
*Director of the United States Patent and Trademark Office*